(12) United States Patent
Wheatley et al.

(10) Patent No.: US 6,266,581 B1
(45) Date of Patent: Jul. 24, 2001

(54) SPATIAL RAM FOR HIGH PRECISION DATA ACQUISITION SYSTEMS

(75) Inventors: Thomas Wheatley, Jefferson, MO (US); E. Clayton Teague, Gaithersburg, MD (US)

(73) Assignee: The United States of America as represented by the Secretary of Commerce, Washington, DC (US)

(*) Notice: Subject to any disclaimer, the term of this patent is extended or adjusted under 35 U.S.C. 154(b) by 0 days.

(21) Appl. No.: 08/853,586

(22) Filed: May 9, 1997

Related U.S. Application Data (60) Provisional application No. 60/017,544, filed on May 10, 1996.

(51) Int. Cl.[7] .................................. G05D 1/02; G05D 1/10
(52) U.S. Cl. ............................................. 700/302; 700/12
(58) Field of Search ............................. 364/528.37, 141, 364/148

(56) References Cited

U.S. PATENT DOCUMENTS

| | | | |
|---|---|---|---|
| 5,060,175 | * 10/1991 | Cubalchini et al. | 364/559 |
| 5,150,035 | * 9/1992 | Nose et al. | 324/711 |
| 5,367,449 | * 11/1994 | Manthey | 364/152 |
| 5,371,487 | * 12/1994 | Hoffman et al. | 340/425.5 |
| 5,382,789 | * 1/1995 | Aoshima | 250/306 |
| 5,383,117 | * 1/1995 | Takai | 364/141 |
| 5,414,260 | * 5/1995 | Takimoto et al. | 250/306 |
| 5,415,027 | * 5/1995 | Elings et al. | 73/105 |
| 5,440,501 | * 8/1995 | Shimomura et al. | 364/560 |
| 5,444,644 | * 8/1995 | Divjak | 364/550 |
| 5,446,357 | * 8/1995 | Baker et al. | 318/632 |
| 5,463,543 | * 10/1995 | Wagner | 364/141 |
| 5,567,872 | * 10/1996 | Kyogaku et al. | 73/105 |

* cited by examiner

Primary Examiner—William Grant
Assistant Examiner—Victoria Robinson
(74) Attorney, Agent, or Firm—Larson and Taylor (57) ABSTRACT

A spatial RAM system uses the position of a data sensor to generate a clock pulse that is used to trigger data acquisition. As a consequence, the errors associated with time-based clock sampling are avoided. This enables more accurate sampling of data at locations desired in space and more easily allows for non-uniform sampling.

25 Claims, 4 Drawing Sheets

SPATIAL RAM FOR HIGH PRECISION DATA ACQUISITION SYSTEMS

This application claims priority from Provisional Application number 60/017,544 filed May 10, 1996.

FIELD OF THE INVENTION

The present invention relates to high precision data acquisition systems, and more particularly to a system and method for acquiring data based on data clocking instead of temporal clocking.

BACKGROUND

In general, servo control systems utilize the concept of fixed-rate sampling, or temporal clocking, to obtain feedback sensor readings and maintain smooth control. A traditional approach to data acquisition in any high precision instrument such as a scanning tunnelling microscope (STM) also uses temporal clocking. In a STM, a high frequency clock is used to latch data as the data sensor moves over the surface of interest. The spacing of the data across the surface is a function of the clock frequency and the speed of the data sensor. The accuracy of the data spacing is a function of the ability of the servo control system to maintain a precise speed over the surface. This places extreme burdens on the servo control system as the desired precision of the instrument approaches atomic dimensions.

Using a single bit from a positional sensor (an interferometer in this case) to act as the data clock for a microtopographer instrument is disclosed in Teague et al., "Para-flex stage for microtopographic mapping," Rev. Sci. Instrum. 59, 67 (January 1988).

SUMMARY

The need for a high precision data acquisition system has been recognized, inter alia, in connection with the Molecular Measuring Machine (M-Cubed) project at NIST (National Institute of Standards and Technology). The basic concept of the M-Cubed was the creation of a metrology reference frame around a scanning tunnelling microscope (STM) or atomic force microscope (AFM). Most, if not all, STMs and AFMs use stepper motors to drive the X and Y stages and simply temporally clocked in the data at each step. Even those microscopes with servo motors did not have a separate positional sensor to monitor the data sensor motion, but trusted that the data sensor moved with a known velocity over the surface. Both the resolution of the measurement and the spacing accuracy of the data relied on the division of the data sensor speed by a clock frequency, or what is referred to hereinafter as temporal clocking.

The metrology reference frame allowed NIST researchers to tie atomic scale measurements to a high precision interferometer positional sensor. Although the use of an interferometer yielded a higher resolution than the traditional approach, it could not, in and of itself, increase the spacing accuracy of those measurements. In other words, each data point was known to a high degree of precision, but the data was still being clocked in temporally. Any system utilizing temporal clocking cannot guarantee precise data spacing unless the servo control is perfect.

Another requirement of the M-Cubed was that of error correction. The traditional approach characterizes the physical motion of the device and then applies the error correction as an additive term in the final servo calculations. This allows for greater accuracy for each data measurement, but at the expense of a lower servo control bandwidth.

Another problem was that the servo system could not be designed to the same degree of accuracy as the interferometer, and that the error correction requirements made it worse. The question of fixed data spacing was not addressed by this approach, and any desire to see the surface at a fixed spacing would require interpolation of the data, something that was not acceptable.

The spatial RAM concept of the present invention expands greatly on the work of Dr. Teague et al. mentioned above, and incorporates several features to aid in the error correction and practical use in the M-Cubed. Generally speaking, the spatial RAM concept replaces the temporal clocking previously used with spatial (data) clocking. The use of spatial clocking effectively decouples the task of data acquisition from that of servo control. This is done by matching data sensor readings along the scanning path with values preloaded into a simple RAM circuit. The spatial RAM generates a latching pulse to the data acquisition system as each value is reached and directly replaces the high frequency clock. Since the spatial RAM allows for any data value to be loaded and matched, a researcher or other user can create non-uniform data spacing over the sample and/or use values to compensate for known errors in the motion.

The spatial RAM eliminates the need for a high-precision servo control system to maintain a precise speed of the sensor and thus reduces the cost of the overall data acquisition system. The ability to preload error compensation values into the RAM eliminates this calculation from the servo loop and allows for greater stiffness and increased accuracy.

The spatial RAM system also enables the use of space-based sampling for data acquisition instead of time-based sampling. The system uses RAM to hold the sensor vales to be sampled, and a comparator to provide matching between the sensor value and the desired location in space. All of this allows the spatial RAM system to perform nonlinear space sampling to aid in error correction techniques, and/or perform non-uniform sampling of the data sensor, such as logarithmic or trapezoidal sampling.

The spatial RAM system is, in general, applicable to any data acquisition system, where an input signal is received, using at least a single sensor and temporal clocking. Some specific examples include any system where a probe is moved over a surface (such as STM or coordinate measuring machines). The spatial RAM system is also applicable to any system where a sensor is swept through space to acquire an image by outputting/emitting a signal and then receiving a return signal (such as radar or laser imaging systems).

In accordance with a preferred embodiment of the invention, a spatial RAM system is provided comprising: means for activating a function based on the position of said system relating to an object of interest; means for sensing the actual position of said function activating means and for producing, responsive to the actual position sensed, a plurality of actual position data bits; memory means for storing a plurality of target positions of said function activating means, each target position being represented by a plurality of bits; means for comparing the plurality of actual position bits and a first of the plurality of the target position bits; and a state machine, including a flip-flop, having a plurality of states for operating the system such that a first state causes both a first set of the first target position bits and a corresponding first set of the plurality of the actual position bits to be read into the comparing means, a second state causes the comparing means to compare the first set of bits with the corresponding first portion of bits, and to latch the flip-flop upon a successful match that sends a clock pulse to the data acquiring means in order to acquire data from the object. Preferably the function activated acquiring data using a data sensor, but alternatively, the function can cause a signal to be emitted and/or received.

In accordance with a further aspect of the invention, a method is provided for activating a function of a system having a component, a state machine, a computer, and a memory, wherein said function is activated based on the position of said component relative to an object of interest, said method comprising the steps of reading a memory address containing a first plurality of target bits representing a first target position of said component; determining a first actual position of said component in space relative to said object; representing said actual position by a second plurality of bits; comparing at least one of said first plurality of bits with a corresponding set of said second plurality of bits; and if said compared bits are equivalent, activating said function and then proceeding again with step (a) using a further plurality of target bits, or if said compared bits are not equivalent, moving said component through space to a further actual position and proceeding again with step (b) using a further plurality of actual position bits. Preferably, the method acquires data using a data sensor, but alternatively a signal can be emitted and/or received.

Other features and advantage of the invention will be set forth in, or apparent from, the following detailed description of the preferred embodiments of the invention.

DETAILED DESCRIPTION OF THE PREFERRED EMBODIMENTS

Figure 1:
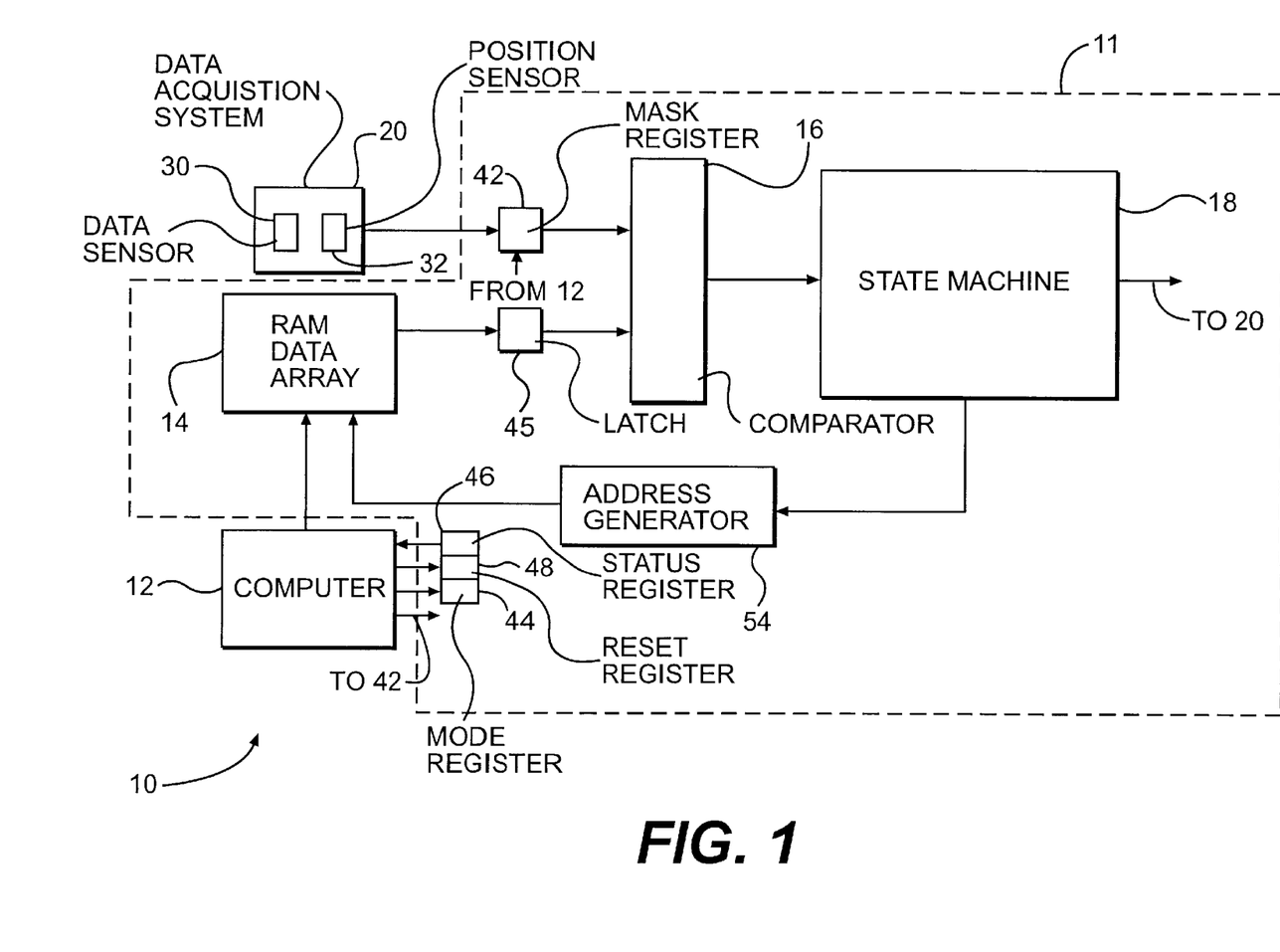
FIG. 1 is a block diagram of a spatial RAM system in accordance with a preferred embodiment of the invention.

As shown in FIG. 1, a spatial RAM system, generally denoted 10, comprises three major components: a spatial RAM circuit 11; a computer 12; and a data acquisition system 20. The spatial RAM circuit 11 comprises a RAM data array 14; a comparator 16; a state machine 18; and an address generator 54. Since the overall system 10 was designed to be modular, the system 10 can be adopted to a wide range of sensors.

Data acquisition system 20 includes a unit or a data sensor 30 for acquiring data and a position sensor 32. The data sensor 30 measures data from an object being of interest, and the position sensor 32 indicates the position of the data sensor 30 in space relative to the object. The data sensor 30 can be any suitable high precision data acquisition unit or device such as those using a probe which is moved over a surface of an object. Examples of suitable data sensors include a scanning tunnelling microscope (STM), an atomic force microscope (AFM), a coordinate measuring machine, or any system where a sensor is swept through space to acquire an image, such as radar or a laser imaging system. The position sensor 32 can also be any suitable device such as an interferometer. Two interferometers can be used to provide both X and Y positional information.

Computer 12 of spatial RAM system 10 is used to load the RAM data array 14 with the desired data bits representative of target positions of data sensor 30. Computer 12 also configures related circuitry (not shown) for the desired modes and any other functions such as data masking as befits the application, and then enables the spatial RAM system 10 for operation. In addition to RAM data array 14, other areas accessible by computer 12 include a MASK register 42, a MODE register 44, a STATUS register 46, and a RESET register 48. Tables 1 and 2, shown below, depict the original bit masks for the MODE register 44 and the original address layout of the spatial RAM circuitry, respectively. The X and Y interferometer registers referenced in Table 2 are for status information only and are not pertinent to the operation of the spatial RAM system 10.

Additional registers listed in the code (see Tables below) and used in an exemplary non-limiting embodiment are the STATUS register 46 referred to above and the servo registers. The STATUS register is not used in the exemplary embodiment. The servo registers are tied to a FIFO that latched both the X and Y interferometers every 1 Khz for the servo control system. This is necessary in the exemplary embodiment since the interferometers are used for both data acquisition and servo control.

TABLE 1

| | |
|---|---|
| #define CPU_ACCESS | 0x0000/*CPU has exclusive use of the RAM*/ |
| #define CIRCUIT_ACCESS | 0x0080/*circuit has exclusive use of the RAM*/ |
| #define USE_X_MODE | 0x0000/*circuit uses "X" interferometer */ |
| #define USE_Y_MODE | 0x0040/*circuit uses "Y" interferometer */ |
| #define UNI_MODE | 0x0000/*unidirectional data acquisition */ |
| #define BI_MODE | 0x0020/*bidirectional data acquisition */ |
| #define USE_4096_MODE | 0x0000/*use the full 4096 RAM values */ |
| #define USE_2048_MODE | 0x0001/*use 2048 RAM values */ |
| #define USE_1024_MODE | 0x0002/*use 1024 RAM values */ |
| #define USE_512_MODE | 0x0003/*use 512 RAM values */ |
| #define USE_256_MODE | 0x0004/*use 256 RAM values */ |
| #define USE_128_MODE | 0x0005/*use 128 RAM values */ |
| #define USE_64_MODE | 0x0006/*use 64 RAM values */ |
| #define USE_32_MODE | 0x0007/*use 32 RAM values */ |

TABLE 2

```
/*These structures depict the layout of the actual spatial RAM circuit */
/*and will be assigned a base address within the Concurrent VME
backplane*/
/*The RAM is first from base +0 thru base +3FFFH using byte
addressing.*/
int values /4096/;/*The Ram is 4Kx32bits, for a total of 16 Kbytes.*/
int dummy;
};
/*The control registers follow at base +4000H thru base +7FFFH. Both */
/*register sets occupy the same address space and are selected by read */
/*or writes to this address space.*/
structure circuit_write_reg{
    short mode_reg;           /*MODE register at offset 0x0*/
    short mask_reg;           /*MASK register at offset 0x2*/
    short future_1_reg;       /*unused, offset 0x4*/
    short future_2_reg;       /*unused, offset 0x6*/
    short reset_reg;          /*RESET register at offset 0x8*/
    short future_3_reg;       /*unused, offset 0xA*/
    short future_4_reg;       /*unused, offset 0xC*/
    short future_5_reg;       /*unused, offset 0xE*/
};
struct circuit_read_reg{
    short x_high_servo;       /*high word of "X" interferometer*/
    short x_low-_servo;       /*low word of "X" interferometer*/
```

TABLE 2-continued

```
  short y_high_servo;      /*high word of "Y" interferometer*/
  short y_low_servo;       /*low word of "Y" interferometer*/
  short stat_reg;          /*STATUS register at offset 0x8*/
  short future_1_reg;      /*unused, offset 0xA*/
  short future_2_reg;      /*unused, offset 0xC*/
  short future_3_reg;      /*unused, offset 0xE*/
};
/*Create a union of these structure for ease of use later*/
union spatial_ram_regs{
  struct circuit_write_reg wr_reg;
  struct circuit_read_reg rd_reg;
};
```

The RAM data array 14 of RAM system 10 is an M×N memory array. The N denotes the size of the incoming data. In an exemplary embodiment, the incoming data is obtained from an interferometer with a full 32-bit parallel output, so the RAM data array 14, the incoming data path, and the comparator 16 are a full 32 bits wide. The M denotes the maximum number of data points to be compared across a single scan. In the exemplary embodiment, 4096 data points are used. This can be reduced using fields in the MODE register 44.

In order to use the spatial RAM system 10, the number of samples (M) to be acquired across a single sweep of data sensor 30 must first be determined, and D, the desired distance between samples. The value D must be equal to or a multiple of the position sensor values tracking the data sensor 30. In other words, if the minimum position sensor 32 resolution is 10 microns, the value D can not be 17.5 microns but must be 10, 20, 30, or other multiples of 10 microns.

A starting location (S) is then determined and the RAM data array 14 of spatial locations where the data sensor 30 is to be sampled are then calculated. For simple, minimal resolution operations, the RAM data array 14 will be of size M and have the following values: (S, S+D, S+2D, . . . , S+MD). The user is also free to vary the data spacing (holding to the minimum sensor resolution rule) for non-linear sampling or error correction. Such a non-linear array of size M might be (S, S+D, S+3D, S+5D, S+8D, . . . , Stop), where the value Stop is some arbitrary ending point determined by the user.

In order to load the data array of spatial locations the system 10 is reset by use of the RESET register 48. This clears the MODE register 44, MASK register 42, and STATUS register 46 and enables the RAM data array 14 to be loaded by the computer 12.

The MODE register 44 is then loaded with the correct value of M and the type of scan to be performed. In the exemplary embodiment referred to above, a default on reset uses the full 4096 values in a unidirectional scan tracking an interferometer (position sensor) 32 that determines the X position of data sensor 30. A user can reduce the number of data points or use a second position sensor (not shown), such as a Y interferometer, by changing the fields in the MODE register 44.

The unidirectional scan tracking mode acquires data in one direction only. This causes the address generator 54 to: (1) start at address location 0 (typically holding the data value S) and (2) increment upon completion of each position sensor 32 value match up to the address value M. The address generator 54 is then cleared back to 0 and the process started over again waiting for the data sensor 30 to sweep across the location S.

Alternatively, a bidirectional mode can be used which starts out the same as the unidirectional mode, but allows for data collection to take place on the return back to the starting location. This is done by simply holding the last address M, and then decrementing back down to zero upon completion of each position sensor 32 value match.

In either uni- or bi-directional mode, the MASK register 42 can be used if an exact match of the position of the data sensor 30 is not necessary. This is useful in a high data sensor 30 speed situation where each individual position sensor 32 (interferometer) value cannot be monitored by the spatial RAM system 10. The MASK register 42 allows up to the lower eight bits sent by the position sensor 32 to be ignored, creating bounding lines of interest on the object instead of single data points.

In utilizing the spatial RAM system 10, the system 10 is next enabled by use of the CIRCUIT_ACCESS bit (See Table 1, row 2) in the MODE register 44. The computer 12 does not have access to the RAM data array 14 after this point, but it can look at the STATUS register 46 to determine if there are any error conditions.

At this point, the RAM data array 14 is filled with an array of desired sample locations to be matched by the comparator 16. The comparator 16 compares two N-bit wide words (32 bits in the exemplary embodiment) and sends a simple binary yes/no answer to the state machine 18. In the exemplary embodiment under consideration, a 16-bit data path from a 32-bit position sensor 32 is used. This reduces the comparator to 16 bits wide, changes the RAM to 8K×16 device, and complicates the state machine. However, the computer 12 and state machine 18 are otherwise essentially independent of the incoming data size.

Figure 2:
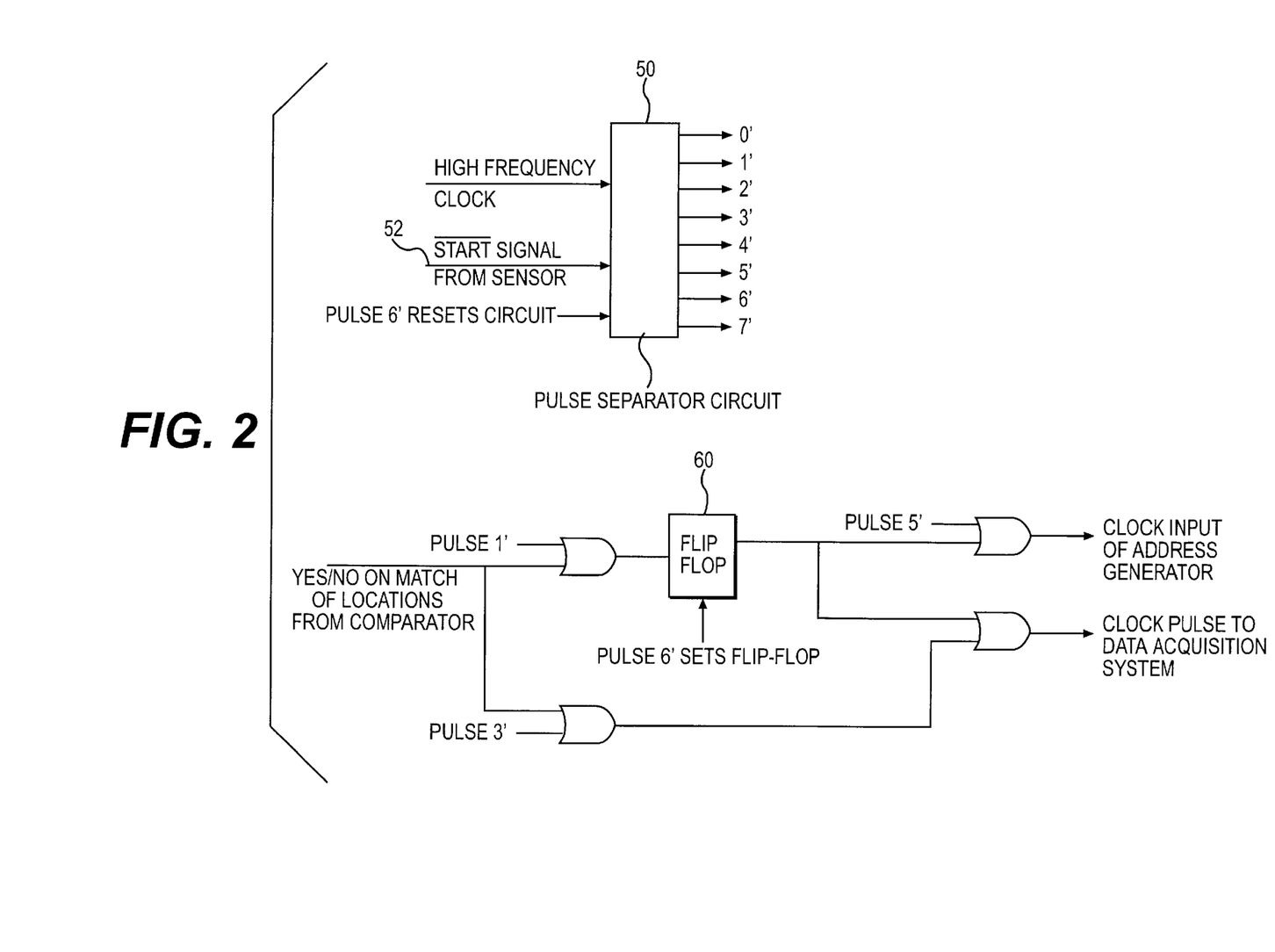
FIG. 2 is a schematic of the state machine portion of the invention.
Figure 3:
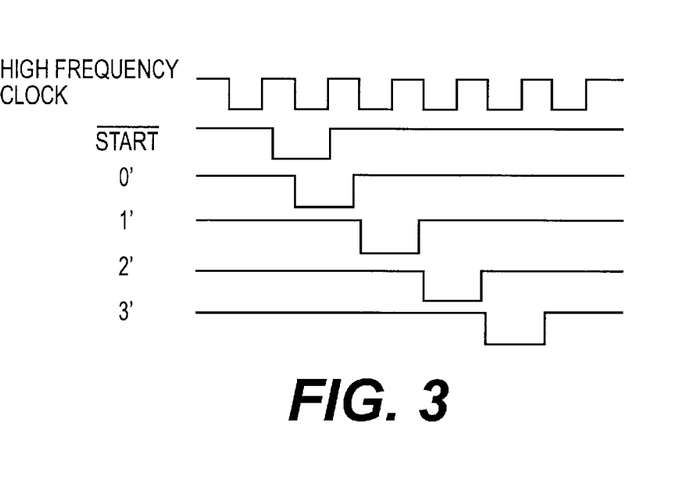
FIG. 3 is a timing diagram associated with a pulse separator of the system of the invention.

The state machine 18 is shown in greater detail in FIG. 2. State machine 18 uses a synchronizing technique by implementing a synchronous circuit. Referring to FIG. 3, a string of pulses separated from a high frequency clock are used to define the events of interest on each rising or falling clock edge. The timing diagram shown in FIG. 3 shows this separation for a simple four state circuit with states 0, 1, 2, and 3. The use of a synchronous circuit in designing a state machine simplifies the circuit and provides exact knowledge of when events occur in time.

An eight pulse separator circuit (synchronizing circuit) 50 is schematically shown in FIG. 2. The eight pulse separator circuit 50 results is used in the exemplary embodiment referred to above where a 16-bit data path is fed from a 32-bit position sensor 32. This requires the answer from matching the first 16 bits (lesser significant bits) to be held until the next 16 bits (greater significant bits) are compared. In a full 32-bit wide design, the state machine is correspondingly simpler and can use as few as four states. Otherwise, the operation of the state machine will be identical.

Referring again to FIG. 2, the START signal 52 comes from the position sensor 32 thereby signifying new position sensor data is available. This starts up the pulse separator 50. At this time, the RAM data array 14 has been sent an address from an address generator 54 (FIG. 1). In the two- 16-bit word data path embodiment referred to above, the falling edge of 0' causes the lower 16 bits to be read out of RAM data array 14. At the rising edge of 0', both the position sensor data, after going through the MASK register 42, and RAM data are assumed to be stable at the inputs to comparator 16. During 1', the comparator 16 examines the two lower data words (i.e., lower 16 bits). The rising edge of 1' latches a flip-flop 60 on a successful match. State 2' gathers the upper 16 bits from the RAM data array 14 and the position sensor 32. The comparator 16 then examines the two upper data words during state 31. If both halves match, a clock pulse is then sent to the data acquisition system 20 to latch the data sensor 30.

In the simpler single 32-bit wide embodiment also referred to previously, the state machine 18 is basically just the output of the comparator 16 gated to the count input of address generator 54 with some additional logic to handle the uni-directional or bi-directional mode of operation. In this 32-bit wide embodiment, the falling edge of state 0' causes the currently addressed data value in the RAM data array 14 to be read out to comparator 16. The position sensor 32 data is also brought to the comparator 16 after first going through the MASK register 42. At the rising edge of state 0', both the (masked) position sensor data and RAM data are assumed to be stable, and latched before being input to the comparator 16, the RAM data being latched at latch 45 (FIG. 1). During state 1', the comparator 16 examines the two data words. The rising edge of state 1' latches a flip-flop 60 on a successful match. If the data match is successful, a clock pulse is generated using the pulse 2' and sent to the data acquisition system.

The remaining states are used for bookkeeping in both the 16-bit and 32-bit embodiments. State 4' is used to switch an up/down pin on a counter in the address generator 54 if the system is in the bi-directional mode and the last address value has been reached. State 5' pulses a count input in the address generator 54 if a successful match was found. State 6' resets the state machine to await another data sample from the position sensor 32.

Turning to timing considerations associated with the system, one basic consideration is the throughput rate of the position sensor 32 that is tracking the data sensor 30 as it moves over the surface of the object of interest. The position sensor 32 needs to supply data at a fast enough rate to the spatial RAM system 10 so that matches can be found for the desired spacing and probe speed. For example, if the desired data sensor speed is 1 millimeter/sec and the desired data spacing is 1 micrometer, the position sensor 32 needs to supply at least 1000 samples per second. This is a minimum lower bound. Good engineering design would call for a data rate at least five times higher. If this is not possible, either the position sensor speed must be slowed, the data spacing increased, or the MASK register 42 used to create bounding lines of interest rather than individual points.

There is a minimum data latency that is directly related to the access speed of the RAM data array 14 and the state machine logic. As mentioned earlier, the 32-bit wide design state machine can be achieved in as few as four states. This data latency is the time between the START signal and pulse 21. The clock frequency coming into the pulse separator 50 determines the timing of the state machine 18.

A further timing consideration is the time required to run through all states of the state machine 18. The data spacing and the probe speed over the surface must be tailored so that the data sensor 30 is not at the next desired data point before the spatial RAM is ready to function. This calculation is similar to that discussed above in conjunction with the sensor throughput.

A limitation of the spatial RAM system 10 described above is its reliance on a high bandwidth, low data latency position sensor 32. The position sensor 32 must supply the data to the spatial RAM system 10 before the data sensor 30 moves too far away from the location of interest. In the M-Cubed embodiment referred to above, the interferometer had a known data latency of 450 nsec. This embodiment of the spatial RAM system generates a match, if applicable, in 250 nsec. (This creates a known displacement in time of 700 nsec from the region of interest, with the actual distance a function of the probe speed.) A typical speed for atomic scale images is 1 mm/sec, which places the probe 0.7 picometers away from the actual data point.

The bandwidth of the position sensor 32 also dictates the maximum speed of the data sensor 30. The spatial RAM system 10 relies on the fact that every data point in the RAM will be "seen" by the system 10. The system 10 will fail if no MASK bits are set and the data sensor 30 moves over the stored location in between position sensor 32 data updates.

The spatial RAM system 10 can also be used in active applications where some form of pulsed energy is required to be placed precisely within some volume of space. Typical applications would include laser machining, laser surgery or other high precision pointing applications.

The spatial RAM system 10 can also be used for non-uniform sampling. An example of such non-uniform sampling exists where a laser is swept over a semicircular region. Here the researcher or user wants to obtain 512 samples of coarse resolution on the outer edges of the image, and create a fine resolution image of 3K samples in the center 60 degree region. All that is required is to determine the mapping between the number of samples in each region of interest and the angular values expected from a rotary position sensor 32 monitoring the laser sweep. Specifically, RAM locations 0–511 could be designated for the 0–60 degree region, locations 512–3583 could be designated for the center 60 degree region, and locations 3584–4095 could be designated for the 120–180 degree region. In a bi-directional data acquisition mode, upon reaching the 4095 location, the addresses would be decremented back to 0 instead of returning to 0 and then acquiring additional data as in the uni-directional mode.

Two common motion errors, cosine and parabolic, between the motion of the data sensor 30 and the object being sensed are correctable by the spatial RAM system 10. A simple cosine or parabolic error is easily handled by projecting the distance traveled by the data sensor onto the measurement path of the data sensor and then loading the corrected values into the RAM data array.

Figure 4:
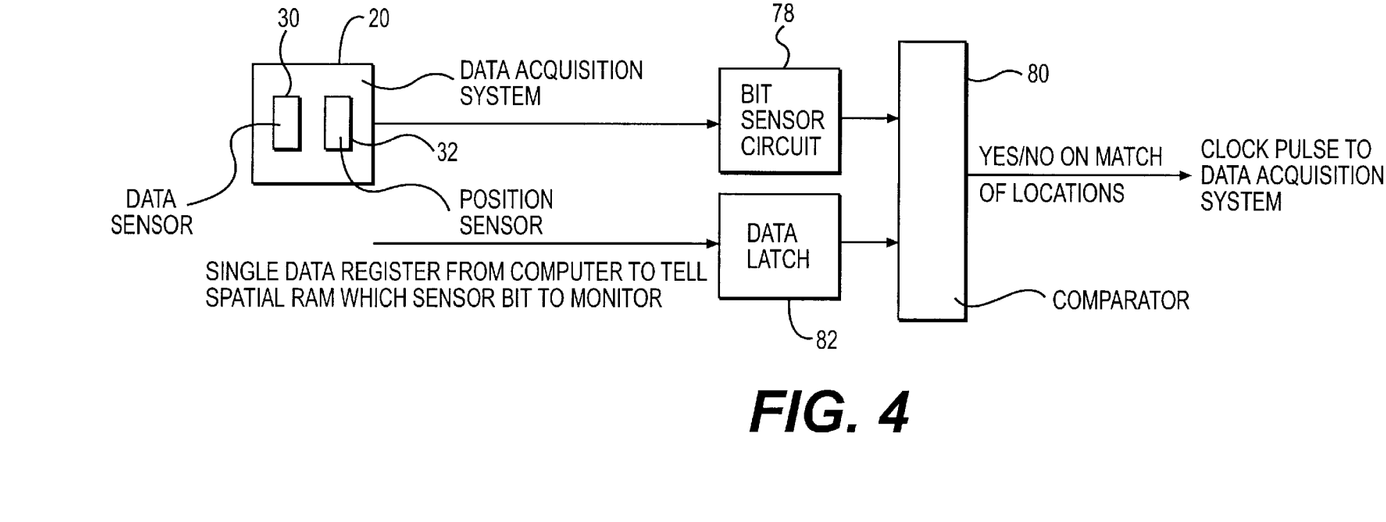
FIG. 4 is first alternative embodiment of the invention.
Figure 5:
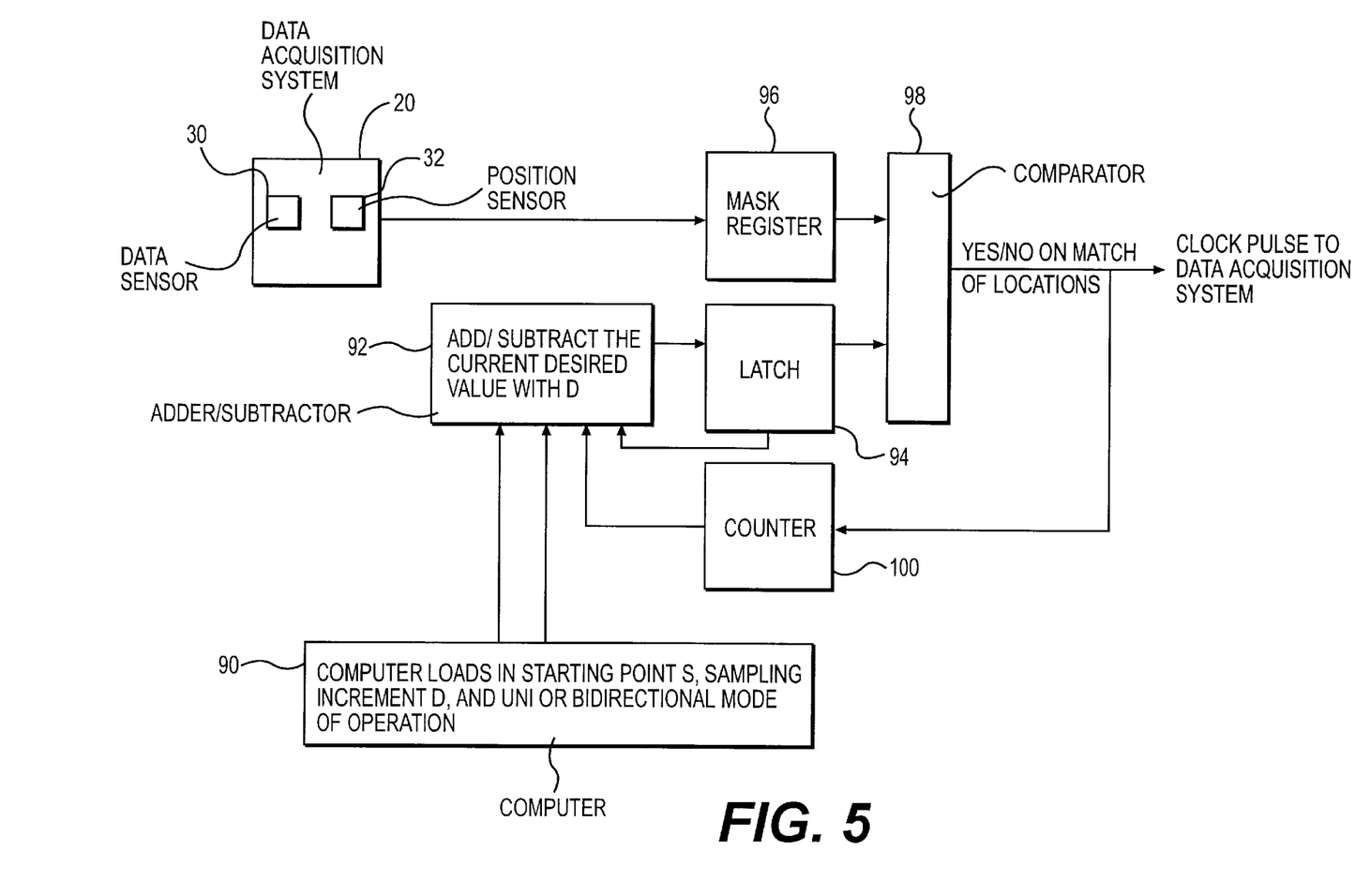
FIG. 5 is a second alternative embodiment of the invention.

FIGS. 4 and 5 show alternative embodiments which are, in essence, simplified versions of the spatial RAM system 10 of FIGS. 1 and 2, and which are useful for certain limited operations.

The embodiment shown in FIG. 4 simply provides a single bit comparison that allows for a selection of bits rather than the Least Significant Bit LSB. Using the LSB of the sensor to clock the data acquisition system has disadvantages due to the ambiguity of direction and the potential for multiple clock pulses being generated whenever the data sensor 30 reverses direction. The use of a higher order bit solves the data sensor reversal problem for large data spacings, but then limits the system to spacings that were a power of two of the sensors being tracked.

In FIG. 4, the current location (N bits wide) of data sensor 30 determined by the position sensor 32 is sent to a bit sensor circuit 78 for picking off the desired position sensor bit. This desired sensor bit is sent to a comparator 80. Also sent to comparator 80, from a data latch 82, is a signal from a single data register that indicates which bit is to be compared by comparator 80. The comparator 80 in this case is typically a single AND or OR gate which is what restricts D to powers of two (D, 2D, 4D, 8D, etc.). This type of comparator suffers from the problem that the lower bits (D, 2D, 4D, etc.,) of the position sensor 32 could oscillate and generate false pulses to the data acquisition system 20.

A modification of the higher order bit concept concerns the use of an adder with a pre-set value (like 17 bits) which is shown in FIG. 5. This approach allows the researcher or user to define the data spacing closer to some convenient value like 100 nm, but still only allows for a fixed spacing with no provision for error correction. The circuit requires a fast adder and can be considered overly complex for such a simple task.

The embodiment shown in FIG. 5 allows for a full N-bit comparison to be made to alleviate the problem of position sensor oscillation mentioned above in conjunction with the embodiment of FIG. 4. A computer 90 loads the starting point S into a register, the desired increment D into another, and the uni-directional mode of operation. An adder/subtractor 92 generates each datapoint in real time and sends the desired value to a latch 94. The position sensor 32 that tracks data sensor 30 sends N-bits to a MASK register 96 before the N-bits are passed to a comparator 98. Upon a successful match in comparator 98, a clock pulse is sent to a data acquisition system 20. A counter 100 is then incremented and a determination made to add or subtract the desired increment D based on the mode of operation (uni- or bi-) and whether the last address has been reached. The appropriate add or subtract signal is then sent to the adder/subtractor 92. The embodiment of FIG. 5 allows for "non powers of two" sampling, but it can only be used for fixed distance sampling (S, S+D, S+2D, etc.,) and can be expensive to build due to the adder/subtractor circuit 92.

The use of a RAM to hold the sensor values solves the problem of a fast adder by simply requiring the computer 12 to preload the RAM. It also allows the use of non-fixed spacing to compensate for any errors between the motion of the stage and the sensor.

Although the present invention has been described to specific exemplary embodiments thereof, it will be understood by those skilled in the art that variations and modifications can be effected in these exemplary embodiments without departing from the scope and spirit of the invention.

What is claimed is:

1. A method for activating a function of a system based on the position in space of a component of the system relative to an object of interest, using spatial position data output from a movable position sensor associated with and movable with said component, said method comprising the steps of:
    (a) reading a memory address containing a first plurality of target bits representing a first target spatial position of the component;
    (b) determining from spatial position data output from said position sensor a first actual position of the component in space relative to the object;
    (c) representing said actual position by a second plurality of bits;
    (d) comparing at least one of said first plurality of bits with a corresponding set of said second plurality of bits; and
    (e) if said compared bits are equivalent, activating said function and then proceeding again beginning with step (a) using a further plurality of target bits, or
    (f) if said compared bits are not equivalent, moving said component and the associated position sensor through a space to a further actual spatial position and proceeding again beginning with step (b) using said further actual position and a further plurality of actual position bits representing said further actual position.

2. A method according to claim 1 wherein said function comprises at least one function selected from the group consisting of (1) acquiring data using a data sensor, (2) emitting a first signal, and (3) emitting a second signal and receiving said second signal.

3. A method according to claim 2 further comprising resetting a state machine of the system after acquiring data in step (e) so as to be prepared to determine another representation of said actual position.

4. A method as claimed in claim 2 wherein said component comprises a data sensor and when said function is activated, said data sensor acquires data.

5. A method according to claim 1 wherein said comparing step further comprises comparing bits of lesser relative significance.

6. A method according to claim 5 further comprising upon a first successful match of said compared bits of lesser relative significance, comparing bits of greater relative significance, and upon a second successful match, proceeding to said acquiring step.

7. A method according to claim 6 wherein said first successful match of latches a flip-flop to enable said bits of greater significance to be compared.

8. A method according to claim 6 further comprising pulsing a count input if said second successful match is determined so as to acquire data.

9. A method according to claim 1 further comprising storing a plurality of target positions in said memory address.

10. A method according to claim 9 wherein said target positions are linearly spaced over said object.

11. A method according to claim 9 wherein said target positions are spaced non-linearly over said object.

12. A method according to claim 9 wherein said target positions are spaced in a non-uniform manner over said object.

13. A method according to claim 9 wherein said system is a data acquisition system and said acquiring step further comprises the step of sending a clock pulse to said data acquisition system to enable said data acquisition system to acquire data.

14. A method according to claim 9 further comprising stopping said method after acquiring data corresponding to a last target position.

15. A method according to claim 9 wherein said data acquisition proceeds uni-directionally across a surface of said object.

16. A method according to claim 9 wherein said data acquisition proceeds bi-directionally across a surface of said object.

17. A method according to claim 1 further comprising switching the counting direction of a counter if a last value is reached in a bi-directional mode.

18. A data acquisition system for acquiring data about an object of interest based on positional information regarding the relative position of the system with respect to the object, said system comprising:
    a movable data sensor for acquiring data about the object of interest responsive to being activated based on the spatial position of said spatial data sensor relative to the object of interest;
    a position sensor, movable with said data sensor, for sensing the actual position of said data sensor and for producing, responsive to the actual position sensed, a plurality of actual position data bits;
    memory means for storing a plurality of target positions of said data sensor, each target position being represented by a plurality of bits;

means for comparing the plurality of actual position bits and a first of the plurality of the target position bits; and a state machine, including a flip-flop, having a plurality of states for operating the system such that a first state causes both a first set of the first target position bits and a corresponding first first set of the plurality of the actual position bits to be read into the comparing means, a second state causes the comparing means to compare the first set of bits with the corresponding first portion of bits, and to latch the flip-flop upon a successful match that sends a clock pulse to the data sensor in order to acquire data from the object.

19. A system according to claim 18 wherein said function activating means is selected from the group consisting of (1) means for acquiring data, (2) means for emitting a signal and (3) means for emitting a sent signal and for receiving said sent signal.

20. A system according to claim 19 wherein said state machine further comprises a third state and a fourth state that are activated after the latch of said flip-flop and before said clock pulse is sent, wherein said third state, entered upon latching of the flip-flop, gathers a second portion of the first target position bits and a second corresponding portion of the actual position bits, and said fourth state compares the second portion bits with the second corresponding portion bits and sends said clock pulse upon a successful match of the comparison between the second portion bits and the second corresponding portion bits to the data acquiring means in order to acquire data from the object.

21. A system according to claim 20 wherein said state machine further comprises a counter having an up/down pin to indicate in a bi-directional data acquiring mode whether to count up or down to correspond to an up direction or a down direction, and a fifth state switches said up/down pin upon reaching a last value in either said up direction or said down direction.

22. A system according to claim 21 wherein said state machine further comprises a count input, and a sixth state that pulses said count input upon determining a successful match of both of said first portion with said first corresponding portion and of said second portion with said second corresponding portion.

23. A system according to claim 22 wherein said state machine further comprises a seventh state that resets said state machine to await another data sample from said data acquiring means.

24. A system according to claim 19 wherein said first portion and said first corresponding portion are the lower sixteen bits of a pair of 32 bit words, and said second portion and said second corresponding portion are the upper 16 bits of said pair of 32 bit words.

25. A method for acquiring data with respect to an object using a system including a data sensor and an associated position sensor movable with said data sensor based on the spatial position of said data sensor relative to the object, said method comprising the steps of:

(a) storing in a memory target spatial positions of said data sensor;

(b) loading one of said target spatial positions into a comparator from said memory;

(c) determining the actual spatial position of said data sensor based on position data received from said position sensor and producing a corresponding actual spatial position output;

(d) using said comparator to compare said one target spatial position and said actual spatial position; and either (e) if said one actual spatial position and said target spatial position are equivalent, acquiring data with said data sensor and then continuing with step (b), or (f) if said one actual spatial position and said target spatial position are not equivalent, moving said data sensor and position sensor through space to a further actual position and continuing with step (c).

* * * * *